United States Patent Office
3,809,644
Patented May 7, 1974

3,809,644
MULTIPLE STAGE HYDRODESULFURIZATION OF RESIDUUM
Axel R. Johnson, North Babylon, N.Y., Ronald H. Wolk, Trenton, N.J., and Govanon Nongbri, Newtown, Pa., assignors to Hydrocarbon Research, Inc., New York, N.Y.
Filed Aug. 1, 1972, Ser. No. 276,907
Int. Cl. C10g 31/14
U.S. Cl. 208—210                                   9 Claims

ABSTRACT OF THE DISCLOSURE

The production of low sulfur fuel oil from high sulfur, high metals-containing petroleum residuum stocks is accomplished by a multiple stage ebullated bed hydrogenation process, wherein fresh catalyst used in the final stage reaction zone is removed and introduced to the preceding reaction zone to materially extend the activity and effective life of the catalyst. All the fresh make-up hydrogen for the process is injected into the final reaction zone, so that the hydrogen sulfide in the gas leaving that reaction zone is maintained below about three mole percent so as to substantially improve the desulfurization reaction rate in that reactor.

BACKGROUND OF THE INVENTION

The operating costs for the desulfurization of high metals-containing petroleum residual oils including the catalyst replacement costs are higher than economically desirable because of the rapid poisoning and deactivation of the hydrodesulfurization catalyst. Characteristic high metals feedstocks usually contain 100 to 700 parts per million of metals, principally nickel and vanadium, in the atmospheric residuum obtained from the crudes. The useful life of the desulfurization catalyst is severely limited by metals deposition in the pore structure of the catalyst. Attempts have been made to use high porosity catalysts which are resistant to such metals poisoning, but these are characteristically low in activity and do not produce fuel oil products having the 0.5 to 1.0 weight percent sulfur as required by the pollution regulations currently being promulgated. On the other hand, use of low porosity high activity catalysts which are effective in meeting the low sulfur product objectives have a very limited catalyst life because of blockage of the catalyst pores.

It has been well known in the art, that contact with expendable particulate solid materials such as bauxite is an effective means of removing vanadium from residual oils. Unfortunately, the reaction rate is quite low and the size of the pretreatment reactor required becomes extremely large in relation to the catalytic reactor, and thereby raises the capital cost of the facility to an uneconomic level.

Other previous work, mainly as described in U.S. Pats. Nos. 2,987,467 and 3,151,060, also treat the metals-containing petroleum stock by first stage hydrocracking. The method disclosed, however, is carried out at relatively high temperatures and results in much higher hydrogen consumption than the presently disclosed invention. Reducing hydrogen consumption and improving hydrogen selectivity are very important economic parameters in the desulfurization of residual oils.

Another major problem in the desulfurization of high metals-containing resids is that the asphaltenic compounds contained in the resid are of a type that are difficult to desulfurize. Specifically, the high vanadium content present in those asphaltenic structures act as a catalyst poison, which produces blockage of the pores near the external surface of the catalyst so that the internal surface pore structure becomes unavailable to carry out the desulfurization reaction. Furthermore, the desulfurization reaction rate constant in the reactor is reduced substantially for increasing metals content on the catalyst.

We have now discovered a technique for pretreating such metals containing residuum feedstock in a first stage ebullated bed reactor using a partially deactivated catalyst, prior to contacting the feed with a highly active particulate catalyst in a final reaction zone. This unique process allows the highly active catalyst to attain desulfurization levels exceeding 75 percent at reasonable space velocities and at a reasonable catalyst cost. Although it is simple enough to obtain 50 percent desulfurization of Venezuelan stocks, there is little economic interest in doing so. The new pollution laws being promulgated require at least 65 to 80 percent desulfurization to meet the specifications being placed on the fuel oils burned in metropolitan areas. These desired desulfurization levels can be reached economically by means of this invention.

SUMMARY OF THE INVENTION

In the hydrodesulfurization of high sulfur and metals-containing petroleum residuum feeds, it has been found that by maintaining an ebullated bed reaction zone in each of multiple staged reactors and adding catalyst either continuously or intermittently to the final reactor and back-staging the catalyst to the preceding reactor, the type and activity of the final stage catalyst used can be such that economic desulfurization of metals-containing residuals at useful levels is achieved. The partially deactivated catalyst backstaged from the final stage reactor then becomes a guard type contact solids for metals removal in the first stage reactor. Furthermore, by injecting all the high purity make-up hydrogen for the process into the final reaction zone and then passing the unused hydrogen from that zone into the preceding stage reactor, the hydrogen sulfide concentration in the final stage reactor can be maintained at a very low level such as below about 3 mole percent. Therefore, the reaction rate in the final reaction zone is maintained at an unusually high level, resulting in the production of low sulfur fuel oil, containing below about 0.6 weight percent sulfur and preferably below 0.5 weight percent sulfur.

In this invention, because of the effectiveness of the back-staging of the catalyst, metals removal can also be maintained at the desired level without resorting to high reaction temperatures. These catalyst materials are quite effective for removing metals such as vanadium and nickel from the feedstock, and the metals content of the oil entering the final reaction stage can be maintained at a relatively low constant level. Therefore, it is possible to utilize therein a catalyst having an extremely high activity and limited pore volume and which is normally susceptible to metals blockage, because the liquid residuum feed material coming from the preceding reaction zones is much lower in metals than the normal feed. Even after being partially deactivated in terms of desulfurization reaction by metals deposited on its surface, this catalyst material can still be used for demetallization. It has been found most convenient and preferable to employ three reaction stages or zones connected in series in this hydrogenation process.

DESCRIPTION OF THE PREFERRED EMBODIMENT

Figure 1:
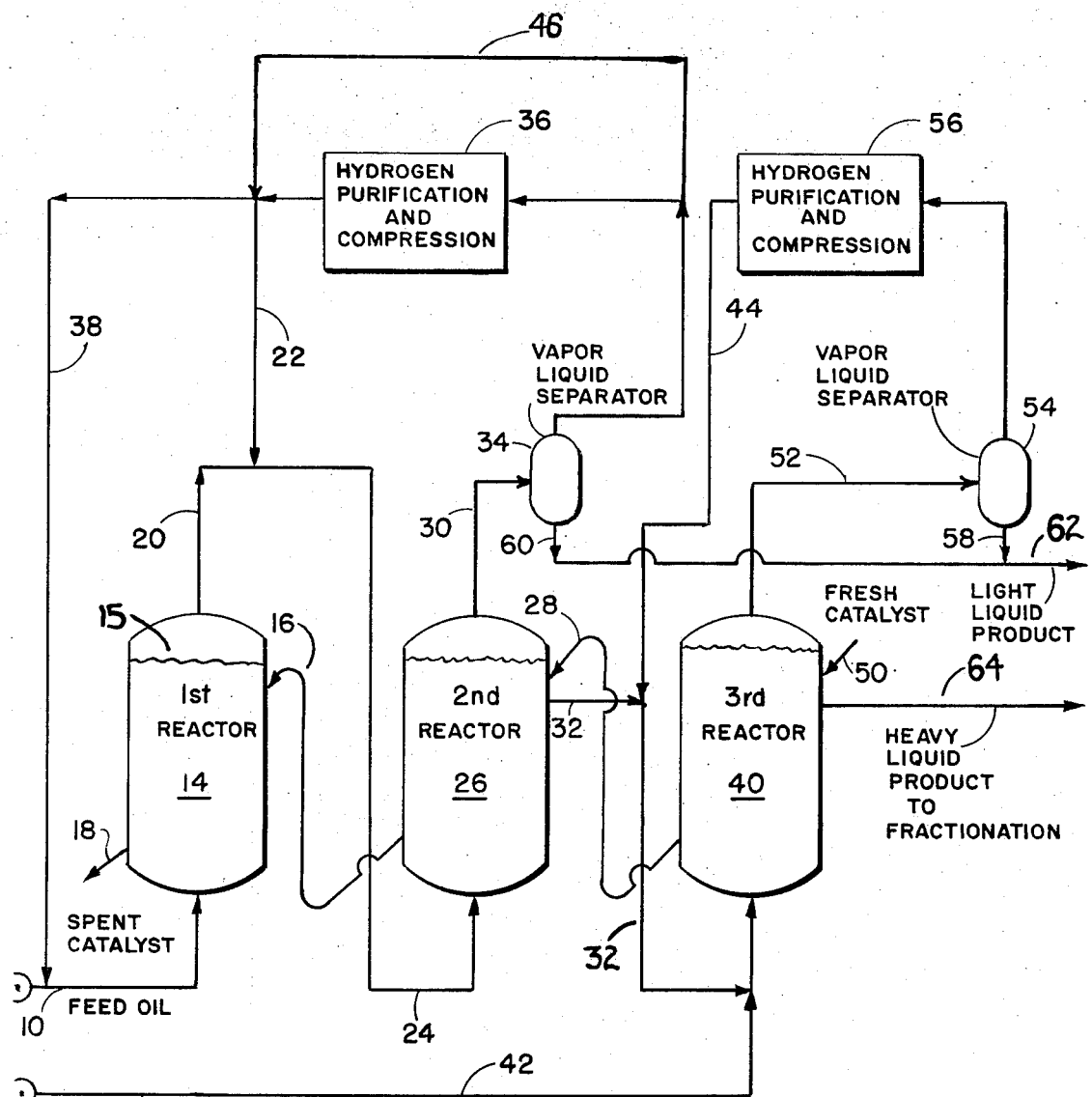
FIG. 1 is a diagrammatic view of a multiple stage ebullated bed system for desulfurizing high metals-containing petroleum residuum feeds.

FIG. 1 schematically shows a three stage ebullated bed hydrogenation process, each stage of which is operated substantially in accordance with the teaching of U.S. Reissue Pat. No. 25,770, wherein a liquid phase reaction is accomplished in the presence of a hydrogen-containing reactant gas and a particulate contact solids or catalyst under conditions of upflow of liquid and gas at a velocity such that the catalyst is maintained in random motion in the liquid and with the removal of a liquid effluent stream substantially free of the catalyst particles.

More specifically, a high sulfur high metals content petroleum residuum in line 10, together with warm recycle hydrogen at 38, is passed upwardly through first stage reaction zone 14. Catalyst is added in line 16 and may be removed at 18, using well known procedures. A total effluent is removed at 20 from above the catalyst bed upper level 15 within reaction zone 14.

The total effluent at 20, together with some supplemental recycle hydrogen at 22, are now passed through line 24 into second ebullated bed reaction zone 26, to which catalyst is added at 28 and removed into line 16 for passing to first reaction zone 14. In this second reaction zone 26, the vapor is preferably removed separately in line 30 from the liquid which is removed in line 32. The vapor, which is principally hydrogen and light hydrocarbons, may be suitably phase separated at 34 with the gas portion being purified in the hydrogen recovery unit 36. The resulting purified hydrogen is recycled through lines 38 and 22 to the first and second reaction zones respectively.

The liquid removed at 32 from second reaction zone 26 is now passed into third and final reaction zone 40, together with an independent supply of heated high purity hydrogen from line 42 and recycle hydrogen through line 44. In this final reaction zone, fresh particulate high activity catalyst is introduced through line 50 and removed through line 28 and then passed to the second reaction zone 26.

From the final reaction zone 40, vapors are withdrawn through line 52 to separator 54. After liquid separation at 54, the remaining vapor passes to the gas recycle compressor unit 56. The resulting liquid stream 58, together with the liquid stream 60 from the gas recovery separator 34, now pass as light liquid product 62 for fractionation into other products such as gasoline. The liquid removed at 64 from the final reactor 40 is a heavy liquid product, which also passes to suitable fractionation steps for processing into low sulfur fuel oil product. For the purpose of this invention, low sulfur fuel oil is defined as containing below about 0.6 weight percent sulfur and preferably below 0.5 wt. percent.

All of the fresh high purity hydrogen that enters the system is injected into the final stage reactor through line 42. Hydrogen not consumed in the final stage is transferred, after compression at 56, through line 46 along with the hydrogen sulfide, methane, ethane and other light hydrocarbon gases generated in the final reactor, into the hydrogen recycle supply entering the first and second stage reactors.

As hereinafter described, the partially deactivated catalyst solids introduced at 16 into the first reaction zone 14 are primarily designed to remove the metals from the residuum feed. The first reaction zone 14 is operated principally as a demetallization zone at relatively low severity conditions, with a temperature between about 700 and 825° F. and preferably 750–780° F., and a hydrogen partial pressure between about 1000 and 3000 p.s.i. and preferably about 2000 p.s.i. The space velocity used is between about 0.10 and 2.0 $V_f/hr./V_r$ (volume of feed per hour per volume of reactor) and preferably about 0.30–0.50 $V_f/hr./V_r$. This pretreatment of the residuum feed in the first stage reaction zone has been discovered to preserve the activity and useful life of the catalyst in the final reaction stage.

The subsequent or second reaction zone 26 is operated as a demetallization and desulfurization zone. The operating conditions of temperature, pressure and space velocity may be substantially the same as in the first reaction zone. The third or final reaction zone 40 is operated principally as a desulfurization zone, with the operating conditions of temperature, pressure and space velocity being substantially the same as in the preceding reactors, except that the hydrogen sulfide content of the effluent gas should not exceed about 3 mol percent.

In accordance with this invention, great economy in catalyst use can be accomplished by the use in the first and second reaction zones of the particulate partially deactivated catalyst from the subsequent zone, and by use in the final reaction zone of fresh limited porosity particulate catalyst for optimum desulfurization activity therein. The fresh catalyst material may be added to and withdrawn from the final reaction zone either continuously or intermittently as found convenient, with the same mode of catalyst addition and withdrawal usually also being used for the preceding reaction zones. Such catalyst addition and withdrawal may be accomplished by using valve means known in the art, such as described in U.S. Pat. No. 3,547,809 to Ehrlich et al.

Catalyst materials which are useful in this invention may be selected from the group consisting of cobalt, molybdenum, nickel or oxides and sulfides thereof and mixtures thereof, and supported on a carrier selected from the group consisting of alumina, silica, and mixtures thereof. Most desirable examples of such catalyst materials include cobalt molybdate on alumina and nickel molybdate on alumina, with the former being preferred. Furthermore, the catalyst should have total pore volume within the range of 0.40–0.65 cc./gm., and preferably between 0.50 and 0.60 cc./gm. The particulate catalyst may be in the form of extrudates of .030–.065 inch diameter or beads of 0.010–0.030 inch diameter, or microspheres having a relatively narrow size fraction within the range of 30–270 mesh (U.S. Sieve series), with the beads being preferred. When the larger size extrudate-shaped catalyst is used in the reactors, it should be understood that increased recirculation of the hydrocarbon liquid within the reactor is required to maintain the ebullated bed conditions therein.

It is generally known that although mixed flow (ebullated bed) type reactors are often less efficient than fixed bed plug flow reactors of equivalent volume, they provide operational advantages of low pressure drop and long life between shutdowns. Also, it was heretofore generally believed that an undesirably large number of mixed flow reactors would be needed to substantially equal the reaction performance of the fixed bed type unit. However, we have discovered that by backflowing the catalyst from the final reaction stage to the preceding stages in succession, three reaction stages can achieve substantially the same desulfurization performance as a fixed bed type reactor having equivalent total volume and operating conditions.

The invention is particularly applicable to producing low sulfur fuel oil from various high sulfur, high metals-containing petroleum residuum feedstock, containing 2 to 5 weight percent sulfur and having metals content ranging from about 20 p.p.m. vanadium to as much as 600 p.p.m. vanadium. Other metals such as iron and nickel are usually also present in such petroleum feedstocks in various concentrations, but the most significant catalyst poisoning material is vanadium. Catalyst replacement rates should be varied as necessary to secure the desired low sulfur products. Replacement rates useful in this invention range from about 0.01 pound catalyst per barrel feed for low metals-containing feedstocks up to as much as 1.5 pound per barrel for very high metals-containing feedstocks.

Several examples of petroleum residuum feedstocks for which this invention is applicable are specified in Table I below:

TABLE I

| Feedstock | Gravity, °API | Sulfur, weight percent | Nickel, p.p.m. | Vanadium, p.p.m. |
|---|---|---|---|---|
| Light Arabian atmospheric resid | 18.0 | 2.8 | 11 | 28 |
| Kuwait atmospheric resid | 17.5 | 3.7 | 15 | 43 |
| Khafji atmospheric resid | 14.2 | 4.3 | 32 | 80 |
| Gach Saran atmospheric resid | 18.1 | 2.81 | 52 | 140 |
| Light Venezuelan atmospheric resid | 17.1 | 2.1 | 40 | 200 |
| Gach Saran vacuum resid | 6.0 | 3.7 | 125 | 340 |
| Lake Medium atmospheric resid | 14.1 | 2.3 | 56 | 398 |
| Heavy Venezuelan atmospheric resid | 11.0 | 2.9 | 71 | 424 |
| Tia Juana vacuum resid | 8.0 | 2.73 | 89 | 570 |
| Bachequero atmospheric resid | 10.5 | 3.1 | 100 | 585 |

EXAMPLES

For some typical metals-containing petroleum feedstocks, analysis of the feed and the materials leaving each reaction stage for a three-stage hydrodesulfurization process are tabulated in Table II. The catalyst used is cobalt molybdate on alumina, and 99% purity hydrogen is fed to the final reaction stage. The hydrogen sulfide in the gas fraction evolved in each reaction stage is as listed in the table below:

TABLE II

| Feedstock | Properties | Catalyst addition to final reaction stage, lb./bbl. feed | Material leaving reaction zone | | |
|---|---|---|---|---|---|
| | | | 1st | 2nd | 3rd |
| Kuwait atm. bottoms: | | | | | |
| Sulfur, wt. percent | 3.7 | 0.2 | 1.13 | 0.41 | 0.19 |
| Vanadium, p.p.m | 43 | Catalyst "A"* | 21.0 | 12.0 | 7.0 |
| Nickel, p.p.m | 15 | | | | |
| Vanadium on catalyst, lb.V/lb. cat | | | 0.06 | .024 | .008 |
| H₂ concentration in reactor gas, mole percent | | | 80 | 80 | 97.5 |
| H₂S concentration in reactor gas, mole percent | | | 9 | 10 | 0.8 |
| Khafji atm. bottoms: | | | | | |
| Sulfur, wt. percent | 4.3 | 0.11 | 1.83 | 0.83 | 0.47 |
| Vanadium, p.p.m | 80 | Catalyst "B" | 46 | 27 | 15 |
| Nickel, p.p.m | 32 | | | | |
| Vanadium on catalyst, lb.V/lb. cat | | | 0.2 | 0.10 | 0.04 |
| H₂ concentration in reactor gas, mole percent | | | 80 | 80 | 96.5 |
| H₂S concentration in reactor gas, mole percent | | | 9.5 | 12.5 | 1.4 |
| Light Venezuelan atm. bottoms: | | | | | |
| Sulfur, wt. percent | 2.1 | 0.21 | 1.62 | 0.9 | 0.45 |
| Vanadium, p.p.m | 200 | Catalyst "B" | 167 | 107 | 69 |
| Nickel, p.p.m | 40 | | | | |
| Vanadium on catalyst, lb. V/lb. cat | | | .208 | .156 | 0.06 |
| H₂ concentration in reactor gas, mole percent | | | 80 | 80 | 95 |
| H₂S concentration in reactor gas, mole percent | | | 3 | 6 | 2.4 |

* Catalyst "A" comprised .032 inch diameter extrudates of cobalt molybdate on alumina, having total pore volume of 0.50 cc./gm.; Catalyst "B" comprised 0.020 inch diameter beads of cobalt molybdate on alumina, having total pore volume of 0.55 cc./gm.

It will be noted that the sulfur and vanadium in the total liquid product leaving each successive reaction stage are progressively reduced, while the vanadium deposited on the reverse flowing catalyst withdrawn from each reaction stage is progressively increased. For the Kuwait atmospheric bottoms feed which contains low metals (43 p.p.m. vanadium) the sulfur impurity in the total liquid product from the third reaction zone is reduced to 0.19 weight percent, whereas for the very high metals-containing light Venezuelan atmospheric bottoms feed containing 200 p.p.m. vanadium the sulfur is reduced only to 0.45 weight percent. The remaining residuum feedstocks listed in Table I may be processed to produce low sulfur fuel oil by varying the reactor operating conditions and catalyst replacement rates as heretofore mentioned.

Figure 2:
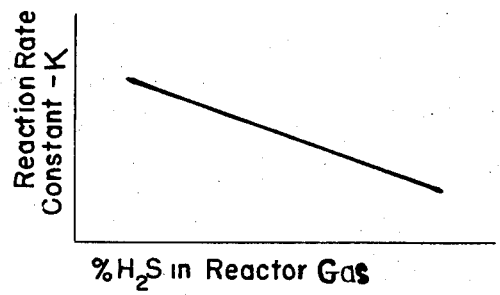
FIG. 2 is a graph showing the reaction rate constant K plotted versus percent hydrogen sulfide in the reactor effluent gas.

It is of major advantage in this invention to maintain relatively pure hydrogen, essentially free of hydrogen sulfide, in the final reaction zone. As shown in FIG. 2, the pseudo Reaction Rate Constant K for a hydrodesulfurization reaction in an ebullated bed reactor is a function of the percent hydrogen sulfide present in the reactor gas. Furthermore, it will be noted that in the curve in FIG. 2, which is a typical curve, the reaction rate drops off rapidly with increase in the hydrogen sulfide composition in the reactor gas. Thus, the concentration of hydrogen sulfide therein is a significant control on the amount of desulfurization that can be accomplished in the last reaction stage. For this invention, it has been found that make-up hydrogen to the last stage should be of high purity, such as exceeding about 95 percent hydrogen and containing essentially no hydrogen sulfide. This is especially important where the overall kinetics are best represented by a second order kinetic model fit, and the desulfurization level for the feed exceeds about 75 percent. Such high purity make-up hydrogen is provided to final stage reactor 40 through line 42.

One of the major advantages in using the ebullated bed reactor system is that a granular partially deactivated catalyst material can be used in the initial reaction stages as a demetallization contact solids. This material can have a fairly wide size distribution, since there are no restrictions as would be found in a normal fixed bed operation where the size and shape of the particles must be large and regular. Of course, regular extruded contact solids can also be utilized in the initial reaction zones, but these are of substantially higher cost than materials that are essentially recovered from fresh catalyst materials having prior usage.

Many modifications of the illustrative embodiment of the invention will occur to those skilled in the art. In view of the various modifications of the invention which may be made without departing from the spirit or scope thereof, only such limitations should be imposed as are indicated by the appended claim.

We claim:

1. A process for the hydrogenation of a metals-containing petroleum residuum feed, which comprises passing the residuum through multiple reaction zones in an up-flow manner under hydrogenation conditions of temperature and pressure in the presence of catalyst which is ebullated in the liquid environment, adding fresh particulate high activity catalyst to the final reaction zone, back-staging said catalyst to said reaction zones in reverse flow relative to the residuum so that the catalyst used in the first reaction zone is partially deactivated, and introducing high purity make-up hydrogen directly to the final reaction zone only, whereby the desulfurization reaction rate therein is maintained at a maximum and desulfurization exceeds 75 percent.

2. The process as claimed in claim 1 having three reaction zones connected in series.

3. The process as claimed in claim 1 wherein the catalyst used in the final reaction zone is of limited porosity and selected from the group consisting of cobalt, molybdenum, nickel or oxides and sulfides thereof, and supported on a carrier selected from the group consisting of alumina, silica, and mixtures thereof.

4. A multistage process for the primary production of low sulfur fuel oil boiling in the range of above 250° F. from a petroleum residuum having in excess of 2.0 weight percent sulfur and more than 35 p.p.m. of metallic compounds, wherein the residuum is passed upwardly through each of multiple reaction zones in succession in the presence of hydrogen and under hydrogenation conditions of temperature and pressure, each of said zones containing a particulate catalyst which is placed in ebullition in the liquid phase environment by the upflow of said residuum and hydrogen, the improvement which comprises:

(a) in the final reaction zone using a fresh particulate high activity hydrogenation catalyst having total pore volume of 0.40 to 0.65 cc./gm.;

(b) in the first reaction zone using this same catalyst after being partially deactivated by metals deposited thereon in the final reaction zone;

(c) passing the entire effluent from the first reaction zone to the subsequent reaction zone;

(d) passing the catalyst from the final reaction zone to the preceding reaction zone;

(e) introducing high purity make-up hydrogen directly to the final reaction zone only; and (f) withdrawing from the final reaction zone a liquid hydrocarbon stream suitable for low sulfur fuel oil product containing below 0.6 weight percent sulfur.

5. The process as claimed in claim 4 except having three reaction zones connected in series and wherein the catalyst, after partial deactivation in the final reaction zone, is passed to the second reaction zone and thence to the first reaction zone.

6. The process as claimed in claim 4, wherein the catalyst replacement rate is 0.01–1.5 pounds catalyst per barrel of residuum feed.

7. The process as claimed in claim 4, wherein the fresh catalyst consists of cobalt molybdate beads having diameter of 0.010–0.030 inch and total pore volume of 0.50–0.60 cc./gm.

8. The process as claimed in claim 4, wherein the independent hydrogen supply purity exceeds 95 percent and contains essentially no hydrogen sulfide, and the hydrogen sulfide in the final reactor gas is below about 3 mole percent.

9. The process as claimed in claim 4 wherein the effluent from the final reaction zone is separated into liquid fractions including at least a low sulfur fuel oil product containing below 0.5 weight percent sulfur and fractions lighter than low sulfur fuel oil.

References Cited
UNITED STATES PATENTS

| | | | |
|---|---|---|---|
| 3,457,161 | 7/1969 | Tulleners | 208—210 |
| 3,418,234 | 12/1968 | Chervenak et al. | 208—210 |
| 3,696,027 | 10/1972 | Bridge | 208—210 |
| 3,519,557 | 7/1970 | Pruiss | 208—210 |
| 3,679,574 | 7/1972 | Irvine | 208—251 |

DELBERT E. GANTZ, Primary Examiner

C. E. SPRESSER, Jr., Assistant Examiner

U.S. Cl. X.R.

208—78, 251 H